(12) United States Patent
Yamauchi

(10) Patent No.: US 7,225,974 B2
(45) Date of Patent: Jun. 5, 2007

(54) SERVICE PROVIDING SYSTEM WITH AUTOMATIC TRANSACTION APPARATUS

(75) Inventor: Tadashi Yamauchi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 175 days.

(21) Appl. No.: 11/067,339

(22) Filed: Feb. 28, 2005

(65) Prior Publication Data
US 2005/0199702 A1     Sep. 15, 2005

(30) Foreign Application Priority Data
Mar. 10, 2004   (JP)   ............... 2004-067122

(51) Int. Cl.
*G06K 5/00* (2006.01)
(52) U.S. Cl. .................... 235/379; 235/380
(58) Field of Classification Search ........... 235/379, 235/383, 382, 380, 492, 493, 375; 705/14, 705/26, 11, 12
See application file for complete search history.

(56) References Cited
U.S. PATENT DOCUMENTS

2002/0147639 A1* 10/2002 Williams et al. ............. 705/14
2002/0184103 A1* 12/2002 Shah et al. .................... 705/26
2004/0167818 A1*  8/2004 Iwahashi ...................... 705/14
2005/0010472 A1*  1/2005 Quatse et al. ................. 705/14
2005/0216347 A1*  9/2005 Williams et al. ............. 705/14

FOREIGN PATENT DOCUMENTS
JP           09-115034         5/1997

* cited by examiner

*Primary Examiner*—Thien M. Le
(74) *Attorney, Agent, or Firm*—Venable LLP; Michael A. Sartori; Catherine M. Voorhees

(57) ABSTRACT

The present invention discloses a service providing system with an automatic transaction apparatus. According to the invention, service contents are dynamically selected and provided from an automatic transaction apparatus for a customer to make it possible to sufficiently utilize a service for the customer and to improve customer satisfaction measurement. The service providing system with an automatic transaction apparatus includes an automatic transaction apparatus which provides a service for a customer who performs a financial transaction, a database for storing customer information, an operation history, and service contents, and a service providing server for selecting at least one of the service contents stored in the database and transmitting each of the service contents to the automatic transaction apparatus. The service providing server dynamically selects each of the service contents on the basis of the customer information and the operation history of the customer.

20 Claims, 14 Drawing Sheets

FIG.9A

| CUSTOMER MASTER | ~32 |
|---|---|
| CUSTOMER ID | |
| FAMILY ID | |
| CUSTOMER NAME | |
| ADDRESS | |
| ADDRESS AREA | |
| MAIL ADDRESS | |
| BUSINESS ADDRESS | |
| BUSINESS ADDRESS AREA | |
| HOBBY TYPE | |
| ... | |

FIG.9B

| SERVICE ACTION LIST | ~35 |
|---|---|
| ACTION ID | |
| CONTENTS IC | |
| PRIORITIES | |
| TARGET CUSTOMER ID | |
| TARGET EVEN | |
| SERVICE TYPE | |
| CHANNEL | |
| TARGET AREA | |
| ... | |

FIG.9C

| SERVICE CONTENTS LIST | ~36 |
|---|---|
| CONTENTS ID | |
| CONTENTS NAME | |
| CONTENTS DETAIL | |
| HOBBY TYPE | |
| ... | |

SERVICE PROVIDING SYSTEM WITH AUTOMATIC TRANSACTION APPARATUS

CROSS REFERENCE TO RELATED APPLICATIONS

The disclosure of Japanese Patent Application No. JP2004-067122, filed Mar. 10, 2004, entitled "service providing system with automatic transaction apparatus". The contents of that application are incorporated herein by reference in their entirety.

BACKGROUND OF THE INVENTION

1. Field of the Invention

The present invention relates to a service providing system with an automatic transaction apparatus.

2. Description of the Related Art

Conventionally, the following system is provided. That is, when a customer of a banking facility such as a bank, a cooperative bank, a post office, or a consumer finance company performs a financial transaction such as deposition, withdrawal, updating of a passbook, balance inquiry, transfer, transfer between accounts, transmission of money, or time and saving deposit setting uses an automatic transaction apparatus such as an ATM (Automatic Teller Machine) or a CD (Cash Dispenser) at a branch, i.e., a branch office, of the banking facility, not only information related to designation of an operating method of the automatic transaction apparatus and a financial transaction such as a transacted amount on a display screen of the automatic transaction apparatus, but also additional information such as a message from the financial institution to the customer, an advertisement, and a notification are displayed.

In this case, when the customer who comes to the branch office inserts a card such as a cash card into a card handing section of the automatic transaction apparatus to execute a financial transaction, the automatic transaction apparatus communicates with a host computer to execute a financial process selected by the customer. For example, when the customer operates the automatic transaction apparatus in the bank to perform balance inquiry and then ends the operation, after a message "This bank has started new AA service since on February 2. Please use this service." is displayed on a display screen, the screen returns to the initial screen.

When a trouble occurs in the automatic transaction apparatus, a message "I'm sorry for impossible transaction. Please come to the counter during business hours." is displayed on a display screen to lead the customer to the counter. In this case, even though a trouble such as failure in the automatic transaction apparatus occurs, the customer can do an appropriate action according to the message of the automatic transaction apparatus.

In recent years, a CRM (Customer Relationship Management) system is adopted to make it possible to form a message having contents corresponding to respective customers. In this case, a message based on information related to basic attributes such as the address, name, age, type of business, income, and family structure of each customer and information such as a history related to accounting transactions performed by each customer in the past is formed to make it possible to show the message to the customer.

In this manner, the financial institution can provide a service such as a service that can timely show a message related to a financial product having contents suitable for each customer for the customer. Furthermore, an appropriate service such as a message having an expression suitable for each customer can be provided for the customer. A customer can enjoy a friendly appropriate service with respect to a financial product having contents suitable for the customer without receiving an unnecessary service such as an unnecessary message.

SUMMARY OF THE INVENTION

However, in a conventional system, only messages, advertisements, and notifications which are formed and stored in a database in advance can displayed on a display screen of an automatic transaction apparatus, and only predetermined services can be provided for the customer. That is, service contents are statically selected and then provided. For this reason, the service contents cannot attract interests of customers, and the provided services are hard to be used at full value.

The present invention has been made in consideration of the problems, and has as its object to provide a service providing system with an automatic transaction apparatus, which dynamically selects service contents to provide the selected service contents for a customer with an automatic transaction apparatus, so as to make it possible to use the service by the customer at full value and so as to improve a customer satisfaction measurement.

In order to solve the above problem, according to a certain aspect of the present invention, there is provided a service providing system with an automatic transaction apparatus, including an automatic transaction apparatus for providing a service for a customer who performs a financial transaction, a database for storing customer information, operation histories, and service contents, and a service providing server for selecting at least one of the service contents from the service contents stored in the database and transmitting each of the selected service contents to the automatic transaction apparatus. In the service providing system with the automatic transaction apparatus, the service providing server dynamically selects each of the service contents on the basis of the customer information and the operation history of the customer.

In order to solve the problem, according to another aspect of the present invention, there is provided a service providing server which connected to an automatic transaction apparatus for providing a service for a customer who performs a financial transaction and a database for storing customer information, operation histories, and service contents and which dynamically selects at least one of service contents stored in the database on the basis of the customer information and the operation history of the customer and transmits each of the selected service contents to an automatic transaction apparatus.

In order to solve the problem, according to still another aspect of the present invention, there is provided a service providing method with an automatic transaction apparatus which can be realized by using an automatic transaction apparatus for providing a service for a customer who performs a financial transaction, a database for storing customer information, operation histories, and service contents, and a service providing server for selecting at least one of the service contents from the service contents stored in the database and transmitting each of the selected service contents to the automatic transaction apparatus. In the service providing method with the automatic transaction apparatus, the service providing server dynamically selects each of the service contents on the basis of the customer information and the operation history of the customer.

According to the present invention, since service contents can be dynamically selected and provided from the automatic transaction apparatus for a customer, a service can be used by the customer at full value, and a customer satisfaction measurement can be improved.

BRIEF DESCRIPTION OF THE DRAWINGS

FIG. 9 is a diagram showing a part of a table configuration of a database in a service providing system with an automatic transaction apparatus according to a third embodiment of the present invention.

DETAILED DESCRIPTION OF THE PREFERRED EMBODIMENTS

Figure 1:
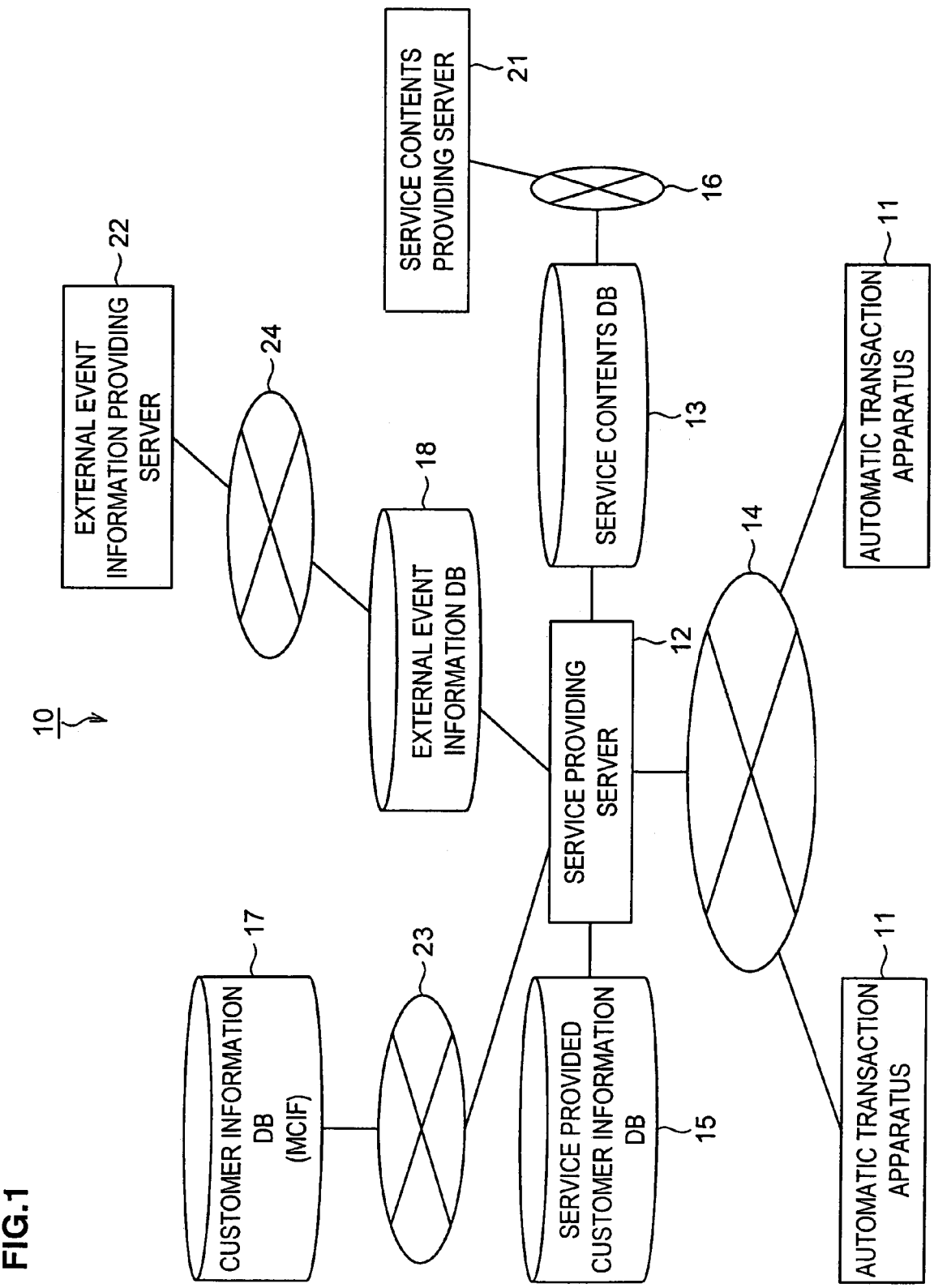
FIG. 1 is a diagram showing the configuration of a service providing system with an automatic transaction apparatus according to a first embodiment of the present invention.

Preferred embodiments of the present invention will be described below with reference to the accompanying drawings. The same reference numerals as in this specification and the drawings denote parts substantially having the same functional configurations, and an overlapping description will be omitted.

FIG. 1 is a diagram showing the configuration of a service providing system with an automatic transaction apparatus system according to the first embodiment of the present invention.

In FIG. 1, reference numeral 10 is a service providing system with an automatic transaction apparatus. The service providing system with an automatic transaction apparatus 10 (hereinafter, referred to as the service providing system 10) is a computer system including at least one computer installed in a branch office which is a branch or the like of a financial institution such as a bank, a cooperative bank, a post office, or a consumer finance company. The service providing system 10 includes an automatic transaction apparatus 11, a service providing server 12, a service contents database 13, a service provided customer information database 15, an external event information database 18, a customer information database 17, and the like. The automatic transaction apparatus 11 can provide a service for a customer who performs a financial transaction. As the automatic transaction apparatus 11, ATM, CD, or the like can be exemplified. The service providing server 12 provides service contents of various additional services provided for a customer who operates the automatic transaction apparatus 11 to perform a financial transaction. The service contents database 13 is a database which stores service contents. The service provided customer information database 15 is a database which stores various pieces of information related to customers. The external event information database 18 is a database which stores various pieces of external event information. The customer information database 17 is a database which stores an MCIF (Marketing Customer Information File).

The service contents database 13, the service provided customer information database 15, and the external event information database 18 are connected to the service providing server 12. The service providing server 12 is connected to the automatic transaction apparatus 11 through a network 14. The service providing server 12 is connected to a customer information database 17 through a network 23. Furthermore, a service contents providing server 21 managed by a company which provides service contents to a financial institution is connected to the service contents database 13 through a network 16. An external event information providing server 22 managed by a company which provides external event information to a financial institution is connected to the external event information database 18 through a network 24.

As the networks 14, 16, 23, and 24, any network such as a wireless or wired leased communication line network or public line network, the Internet, a LAN (Local Area Network), and a WAN (Wide Area Network) may be used. The networks 14 and 23 are desirably leased communication line networks. However, VPNs (Virtual Private Networks) using a public communication line network may also be used. In FIG. 1, a system configuration related to an accounting transaction which is an essential work of the automatic transaction apparatus 11 is omitted.

The automatic transaction apparatus 11 is operated by a customer herself/himself of a financial institution to perform a financial transaction such as deposition, withdrawal, updating of a passbook, balance inquiry, transfer, transfer between accounts, transmission of money, or time and saving deposit setting. The automatic transaction apparatus 11 may be a multifunction terminal such as a KIOSK terminal having other functions, e.g., a ticket reserving function, a product purchase offering function, a credit check function for a credit card, an installation information guide function, and the like. The customer is an ordinary person who opens his/her bank account to use a financial institution. However, the customer may be a company, a group, or the like.

The automatic transaction apparatus 11 includes a customer operation section. The customer operation section includes an input device such as a keyboard, a touch panel, or a mouse and a display device such as a CRT, a liquid crystal display, or an LED (Light Emitting Diode) display. The customer operation section may be a touch panel having both the functions of an input device and a display device.

The automatic transaction apparatus 11 includes a card handing section. The card handing section handles a card such as a cash card to function as an ID acquiring section which acquires a customer ID from the card. The card is a card which is issued by a financial institution to a customer and which is used to perform a financial transaction such as deposition, withdrawal, transferring, or balance inquiry. The card has magnetic stripes in which information such as a customer name, an account number, a password, and a customer ID. As a material in which the information is stored, in place of the magnetic stripes, an IC buried in the card may be used. The card handing section has a card slot in which a card is inserted. In the card slot, a conveyance unit for conveying a card and a recording head such as a magnetic head to perform reading, overwriting, erasing, or the like of information stored in the magnetic stripes or the IC of the card are arranged.

The automatic transaction apparatus 11 may include a bank updating section which updates a passbook such as an account book. In this case, the passbook updating section, like the card handing section, functions as an ID acquiring section which acquires a customer ID and reads information such as financial institution identifying information, a customer name, an account number, a password, and a customer ID stored in magnetic stripes held by the passbook. As a material in which the information is stored, in place of the magnetic stripes, an IC buried in the passbook may be used.

Furthermore, the automatic transaction apparatus 11 has a printing section which prints a transaction detail slip to issue the transaction detail slip. In the embodiment, the printing section is designed to print a receipt number on the transaction detail slip serving as a medium. The transaction detail slip is a slip on which information related to a financial transaction such as deposition, withdrawal, updating of a passbook, balance inquiry, transfer, transfer between accounts, transmission of money, or time and saving deposit setting performed by a customer is printed. On the transaction detail slip, an account number, a type of financial transaction, a transacted amount, and the like are printed. In the embodiment, when a customer operates the customer operation section to select consulting at the counter, information such as a counter number, a receipt number of the customer, and the like are printed on the transaction detail slip.

The automatic transaction apparatus 11 has a banknote depositing and withdrawing section which handles banknotes and a coin depositing and withdrawing section which handles coins. Furthermore, the automatic transaction apparatus 11 includes a control section which integrally controls the operation of the automatic transaction apparatus 11. The control section includes, an arithmetic unit such as a CPU or an MPU, a storage device such as a magnetic disk, a semiconductor memory, a communication unit, and the like. In FIG. 1, although two automatic transaction apparatus 11 are shown, the number of automatic transaction apparatuses 11 may be one or three or more.

The service providing server 12 is a computer including an arithmetic unit such as a CPU or an MPU, a magnetic disk, a storage device such as a semiconductor memory, an input device such as a keyboard or a mouse, a display unit such as a CRT or a liquid crystal display, a communication interface, and the like. The service providing server 12 receives and decodes data of a card inserted into the automatic transaction apparatus 11. The service providing server 12 selects at least one of service contents optimized to a customer who operates the automatic transaction apparatus 11 from the service contents stored in the service contents database 13 to transmits each of the selected service contents to the automatic transaction apparatus 11.

Information stored in each database will be described below.

Figure 2:
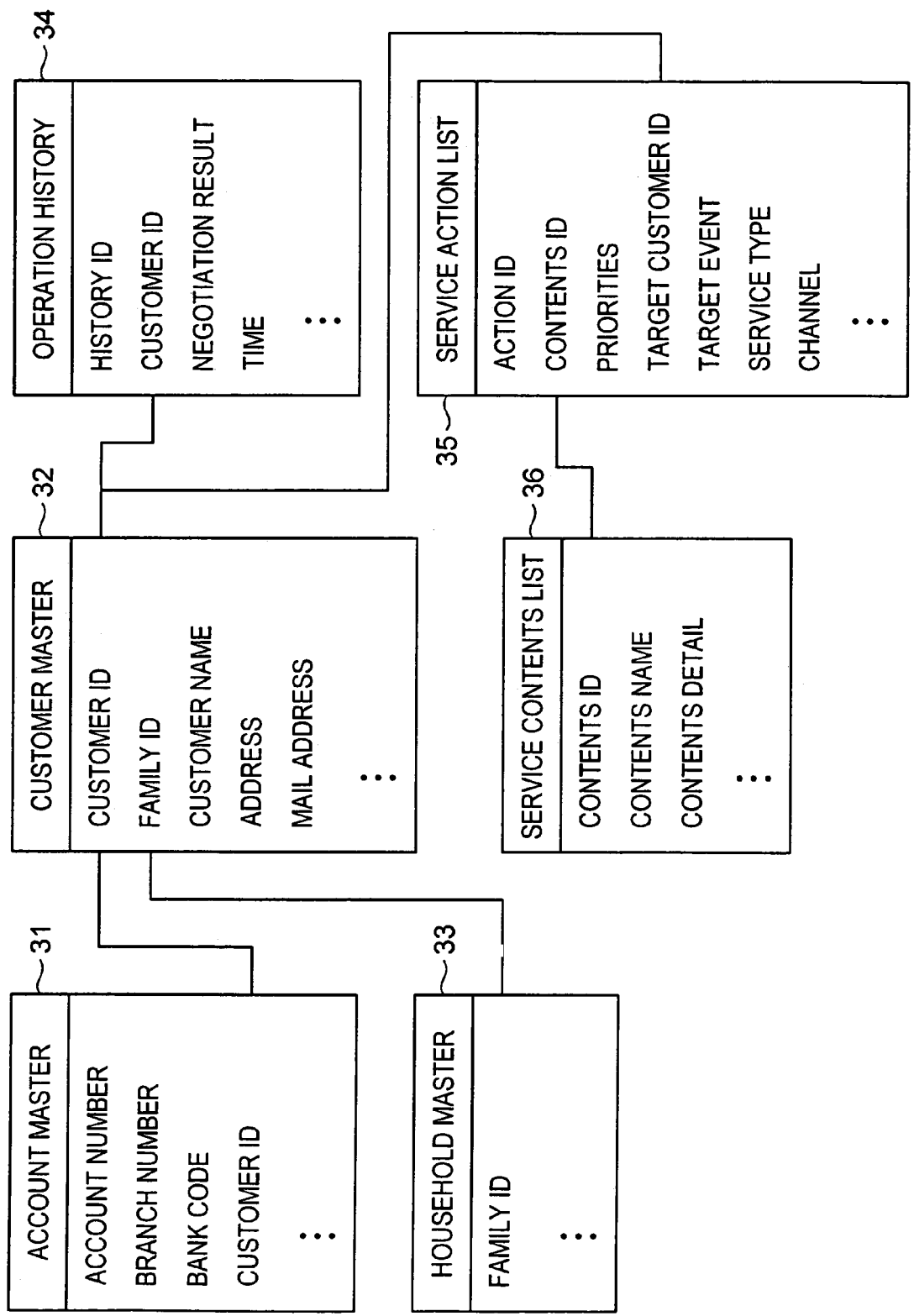
FIG. 2 is a diagram showing a logical table configuration of a database in the service providing system with the automatic transaction apparatus according to the first embodiment of the present invention.

FIG. 2 is a diagram showing a logical table configuration of a database in the service providing system with the automatic transaction apparatus according to the first embodiment of the present invention.

In the embodiment, information stored in the databases in the service providing system 10, i.e., the service contents database 13, the service provided customer information database 15, the customer information database 17 and the external event information database 18, as shown in FIG. 2, constituted by a table consisting of an account master 31, a customer master 32, a household master 33, an operation history 34, a service action list 35, and a service contents list 36. The account master 31 includes fields of an account number, a branch number, a bank code, a customer ID, and the like. The customer master 32 includes fields of a customer ID, a family ID, a customer name, an address, a mail address, and the like. The household master 33 includes fields of a family ID and the like. The operation history 34 includes fields of a history ID, a customer ID, a negotiation result, time and the like. The service action list 35 includes fields of an action ID, a contents ID, a priority, a target customer ID, a target event, a service type, a channel, and the like. The service contents list 36 includes fields of a contents ID, a contents name, a contents detail, and the like.

A relationship between the masters and the databases shown in FIG. 1 will be described below.

The pieces of information of the account master 31, the customer master 32, and the household master 33 are included in the customer information database 17. The pieces of information of the service contents list 36 and the service action list 35 are included in the external event information database 18 and the service contents database 13. The external event information database 18 and the service contents database 13 actually have data of the same format. Since the external event information database 18 is to receive information from the external event information providing server 22 serving as an externally arranged server, the external event information database 18 is independently arranged. However, as a matter of course, the external event information database 18 may be arranged integrally with the service contents database 13. In order to prevent processing complication, necessary data may be appropriately copied from the external event information database 18 to access only the service contents database 13. The information of the operation history 34 is included in the service provided customer information database 15.

Main ones of the above fields will be described below. The customer ID is an ID for uniquely identifying a customer who uses the automatic transaction apparatus 11. The family ID is an ID for uniquely identifying a household. Customers belonging to the same household have the same ID. The negotiation result expresses a result of negotiation. As the negotiation result, depending on browsing of service contents or an operation status of the automatic transaction apparatus 11, "hopeless", "hopeful", "establishment", or the like is stored. The contents ID is an ID for uniquely identifying each of the service contents. The priority represents a priority of service contents. When a priority is low, the corresponding service may not be performed depending on the latest negotiation result. The target customer ID is an ID of a customer whom service contents target. When all the customers are targeted, the field of the target customer ID is blank. When a plurality of customers is targeted, a plurality of record rows is formed. The service type expresses a type such as "service performed countless times", "service performed only once", "service performed only once by a household", "service performed only once in all channels", or the like. The channel represents a channel in which a service is performed. When a device except for the automatic transaction apparatus 11 is set in the channel, no service is performed in the automatic transaction apparatus 11, and the service is performed at another channel such as a reception counter. The target event is a flag to be targeted such as "when the service is used at the first time", "when the service is used at the ten times", "when the service is used at the one-hundred times". When the target event is blank, all users are targeted.

When registrations such as a mail address or an address is erroneous, contents which provide a passing screen or a correction screen are registered with a high priority in the service action list 35 when the erroneous registration is detected.

An operation of the service providing system 10 having the above configuration will be described below.

Figure 3:
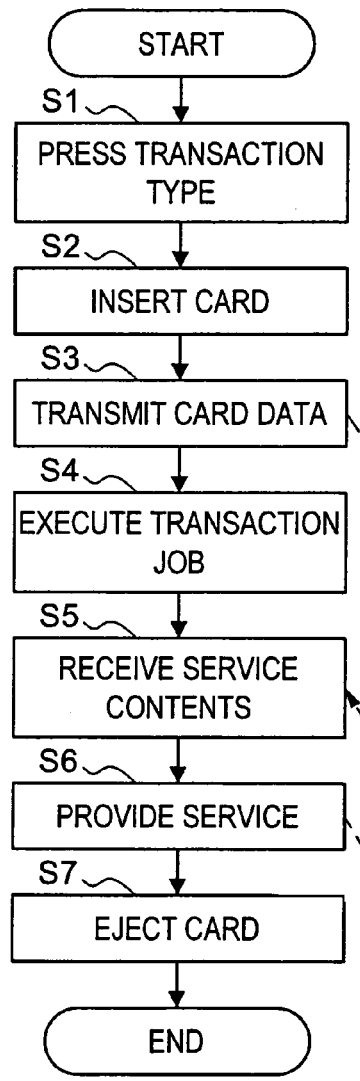
FIG. 3 is a flow chart showing an operation of the service providing system with the automatic transaction apparatus according to the first embodiment of the present invention.
Figure 3:
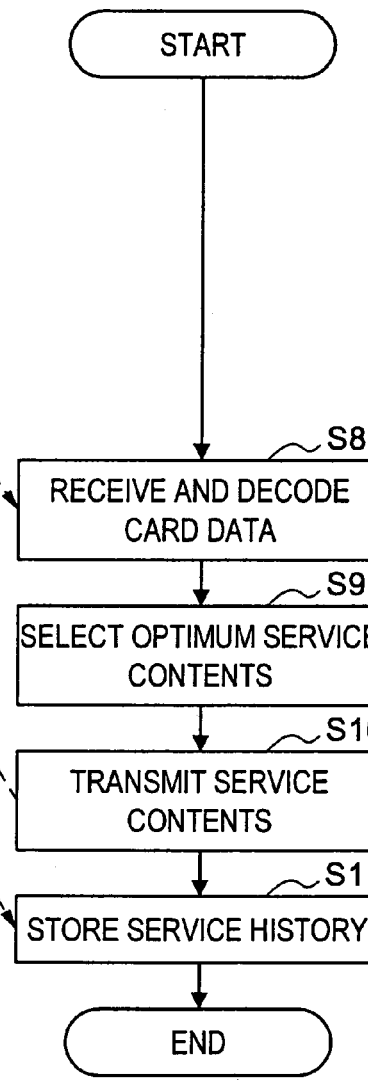
Figure 3:
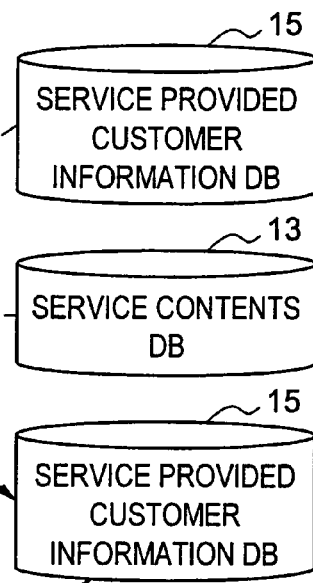

FIG. 3 is a flow chart showing an operation of a service providing system with an automatic transaction apparatus according to the first embodiment of the present invention.

A customer operates the automatic transaction apparatus 11 installed in a financial institution to perform a financial transaction such as deposition, withdrawal, transfer, or balance inquiry. At this time, a transaction type selection screen is displayed on the display device of a customer operation section. A case in which the customer operation section is a touch panel having both the functions of an input unit and a display unit is described here. In the customer operation section, the customer selects a desired transaction type from displayed transactions. For selecting, the customer touches a key for, e.g., balance inquiry in the financial transactions displayed on the customer operation sections. That is, the customer touches a key to select a transaction type.

Subsequently, since a screen for designating insertion of a card is displayed on the customer operation section, the customer inserts a cash card into a card slot of a card handling section as a card. Although the customer can also use passbook such as an account book in place of a card, a case in which a cash card is used will be described in the embodiment. At this time, since a designation for inputting a password and a ten-key are displayed on the customer operation section, the customer touches the ten-key to input a password. A recording head of the card handing section is reads card data such as a customer ID or the like which is information stored in magnetic stripes or an IC of the cash card. The card data includes an account number, a branch number, a bank code, and the like. The card data is transmitted from the automatic transaction apparatus 11 to the service providing server 12.

When the service providing server 12 receives the card data from the automatic transaction apparatus 11, the service providing server 12 decodes the card data and selects one or more optimum service contents according to a predetermined program registered in advance. The service providing server 12 transmits the selected service contents from the service contents database 13 to the automatic transaction apparatus 11.

The automatic transaction apparatus 11 receives the service contents transmitted from the service providing server 12. Upon completion of a business transaction, the automatic transaction apparatus 11 provides an additional service based on the service contents to the customer who uses the automatic transaction apparatus 11.

In this case, the customer makes some kind of reaction such as "Information request button was pressed." "Registration of mail address or change operation for personal information such as address correction was performed." "Service contents were instantly ended." to the service contents displayed on the automatic transaction apparatus 11. The automatic transaction apparatus 11 transmits the operation history to the service providing server 12 and ejects the cash card from the card slot to end the process. When the service providing server 12 receives the operation history, the service providing server 12 stores the service history in the service provided customer information database 15 to end the process.

The service providing system 10 dynamically changes the details of the next and subsequent services depending on the operation of the automatic transaction apparatus 11 by the customer. The service providing system 10 can also dynamically change the details depending on the number of history cases. Furthermore, the service providing system 10 can cooperate with histories of the family of the customer with reference to the customer information database 17. Since history information except for the automatic transaction apparatus 11 is stored in the service provided customer information database 15, more variable service contents can also provided in cooperation with not only the transaction history but also histories in a call center, a counter, an RBT (Remote Branch Terminal), and the like.

The flow chart will be described below.

Step S1 A transaction type is selected by a customer.

Step S2 A cash card is inserted into the card slot of the card handing section by the customer.

Step S3 The automatic transaction apparatus 11 transmits card data to the service providing server 12.

Step S4 The automatic transaction apparatus 11 executes a process of transactional work.

Step S5 The automatic transaction apparatus 11 receives one or more service contents from the service providing server 12.

Step S6 The automatic transaction apparatus 11 provides a service for the customer.

Step S7 The automatic transaction apparatus 11 ejects the cash card from the card slot to end the process.

Step S8 The service providing server 12 receives the card data from the automatic transaction apparatus 11 and decodes the card data.

Step S9 The service providing server 12 selects optimum service contents.

Step S10 The service providing server 12 transmits one or more service contents to the automatic transaction apparatus 11.

Step S11 The service providing server 12 stores a service history in the service provided customer information database 15 to end the process.

An operation performed when the service providing server 12 selects service contents to be provided for a customer will be described below in detail.

Figure 4:
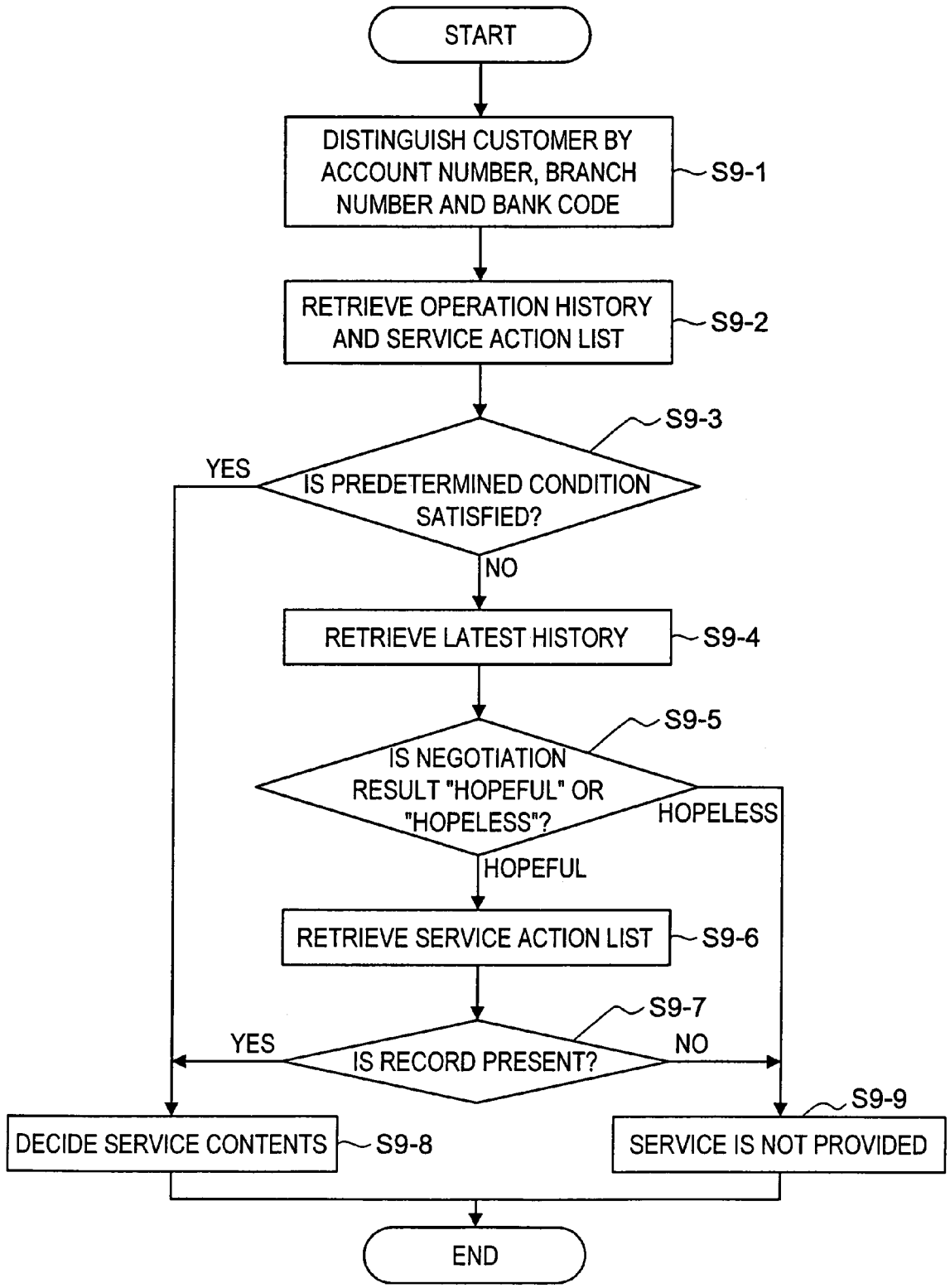
FIG. 4 is a flow chart showing an operation performed when a service providing server according to the first embodiment of the present invention selects service contents.

FIG. 4 is a flow chart showing an operation performed when a service providing server according to the first embodiment of the present invention selects service contents.

When the service providing server 12 receives the card data from the automatic transaction apparatus 11 and decodes the card data, the service providing server 12 distinguishes a customer on the basis of an account number, a branch number, and a bank code. On the basis of the customer ID of the customer, the service providing server 12 searches the operation history 34 and the service action list 35. The service providing server 12 decides whether there is a record which satisfies predetermined conditions. The predetermined conditions include a condition in which a priority is higher than a reference priority, a condition in which there is information of a target event, a condition in which a history condition is matched when the number of times of use in the target event is designated, a condition in which a channel is the automatic transaction apparatus 11, a condition in which a customer corresponds to a target customer, and the like. When a record which satisfies the predetermined conditions is included in the service action list 35, the service providing server 12 decides at least one of the service contents. More specifically, the service providing server 12 determines a service content specified by the contents ID in a record which satisfies the predetermined conditions as the service content to be provided for a customer. As a reference value for comparing priorities with each other, a predetermined value (a first value), is set in advance.

On the other hand, when there is no record which satisfies the predetermined conditions, the service providing server 12 searches the latest history on the basis of the customer ID. It is decided whether there is a record in which a field of a negotiation result is "hopeful". When there is no record in which a field is "hopeful", the process is ended without performing the service. In other words, the service providing server 12 ends the process without selecting any of the service contents. When ten or more fields of "hopeless" continue, or when a rate of selecting "hopeless" in a predetermined period is, e.g., 90[%] or more, "hopeless" is determined, and the service may not be performed. On the other hand, as a result of searching of the latest history, when there is a record in which a field of a negotiation result is "hopeful", the service providing server 12 searches the service action list 35 under predetermined conditions. The predetermined conditions include a condition in which a channel is the automatic transaction apparatus 11, a condition in which a customer corresponds to a target customer, a condition in which a service satisfies the conditions and has the highest priority, and the like. The service providing server 12 decides whether there is a record which satisfies the predetermined conditions as a result of searching of the service action list 35. When there is the record, the service providing server 12 determines service contents. When there is no record, the process is ended without performing a service.

In this case, as a reference value for comparing priorities with each other, a value (a second value) lower than that in the previous searching is used. In this manner, unnecessary information is not given to an unlikely customer, and contents having a low priority can also be provided for a likely customer by second searching.

The flow chart will be described below.

Step S9-1 The service providing server 12 distinguishes a customer on the basis of an account number, a branch number, and a bank code.

Step S9-2 The service providing server 12 searches the operation history 34 and the service action list 35 on the basis of a customer ID.

Step S9-3 The service providing server 12 decides whether there is record which satisfies the predetermined conditions as a searching result. When there is the record which satisfies the conditions, the flow shifts to step S9-8. When there is no record which satisfies the conditions, the flow shifts to step S9-4.

Step S9-4 The service providing server 12 searches the latest history in the operation history 34 on the basis of the customer ID.

Step S9-5 The service providing server 12 decides whether a record in which a field of a negotiation result is "hopeful" is detected as a result of searching. When the record in which the field of the negotiation result is "hopeful" is detected, the flow shifts to step S9-6. When the record in which the field of the negotiation result is "hopeful" is not detected, the flow shifts to step S9-9.

Step S9-6 The service providing server 12 searches the service action list 35 under predetermined conditions.

Step S9-7 The service providing server 12 decides whether there is a record which satisfies the predetermined conditions as a result of searching of the service action list 35. When there is the record, the flow shifts to step S9-8. When there is no record, the flow shifts to step S9-9.

Step S9-8 The service providing server 12 determines service contents and ends the process.

Step S9-9 The service providing server 12 ends the process without performing a service.

An operation performed when the service providing server 12 stores a service history will be described below.

Figure 5:
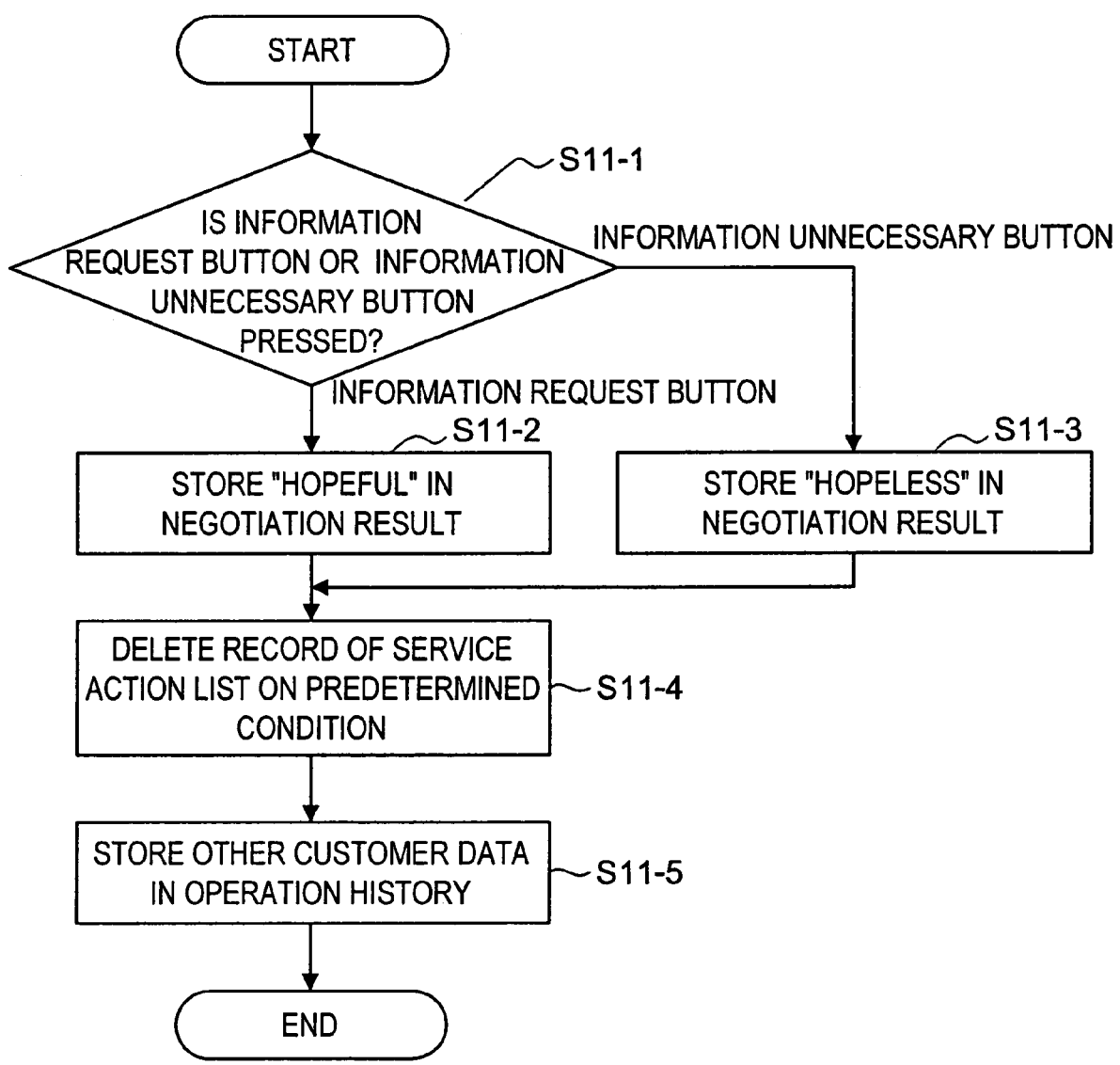
FIG. 5 is a flow chart showing an operation performed when the service providing server according to the first embodiment of the present invention stores a service history.

FIG. 5 is a flow chart showing an operation performed when the service providing server according to the first embodiment of the present invention stores a service history.

After the service providing server 12 transmits the selected service contents to the automatic transaction apparatus 11, the service providing server 12 decides whether a period of time in which the automatic transaction apparatus 11 provides a service for a customer, i.e., service time is a predetermined period of time or longer. When service time is a predetermined period of time or longer, the service providing server 12 stores "hopeful" as positive information in a field of a negotiation result. When the service time is shorter than the predetermined period of time, "hopeless" is stored as negative information in the field of the negotiation result.

When a screen of each of the service contents includes an information request button and an information unnecessary button, "hopeless" may be stored when the information unnecessary button is pressed, and "hopeful" may be stored when the information request button or a button for displaying details is pressed.

Subsequently, the service providing server 12 deletes a record of the service action list 35 under predetermined conditions. The predetermined conditions include a condition in which a record is not deleted when a service type is "service performed countless times", a condition in which a record is deleted when the service type is "service performed only once", a condition in which all records having the same customer ID and the same contents ID are deleted when the service type is "service performed only once in all channels", a condition in which all records having the same customer ID and the same contents ID are deleted when the service type is "service performed only once by a household", and the like. The service providing server 12 stores other customer data in the operation history 34 to end the process.

The flow chart will be described below.

Step S11-1 The service providing server 12 (or the automatic transaction apparatus 11) decides whether the information request button is pressed or the information unnecessary button is pressed. When the information request button is pressed, the flow shifts to step S11-2. When the information unnecessary button is pressed, the flow shifts to step S11-3.

Step S11-2 The service providing server 12 stores "hopeful" in a field of a negotiation result.

Step S11-3 The service providing server 12 stores "hopeless" in the field of the negotiation result.

Step S11-4 The service providing server 12 deletes a record of the service action list 35 under predetermined conditions.

Step S11-5 The service providing server 12 stores other customer data in the operation history 34 to end the process.

In this manner, in the embodiment, since service contents to be transmitted to the automatic transaction apparatus 11 can be changed depending on an operation history of a customer, service contents optimum to respective customers can be dynamically provided. More variable service contents can provided in cooperation with access histories in other channels such as a call center, a counter, an RBT, and the like.

The second embodiment of the present invention will be described below. The same reference numerals as in the first embodiment denote parts having the same structures as those in the first embodiment in the second embodiment, and a description thereof will be omitted. The same operation and the same effect as those in the first embodiment will be omitted.

Figure 6:
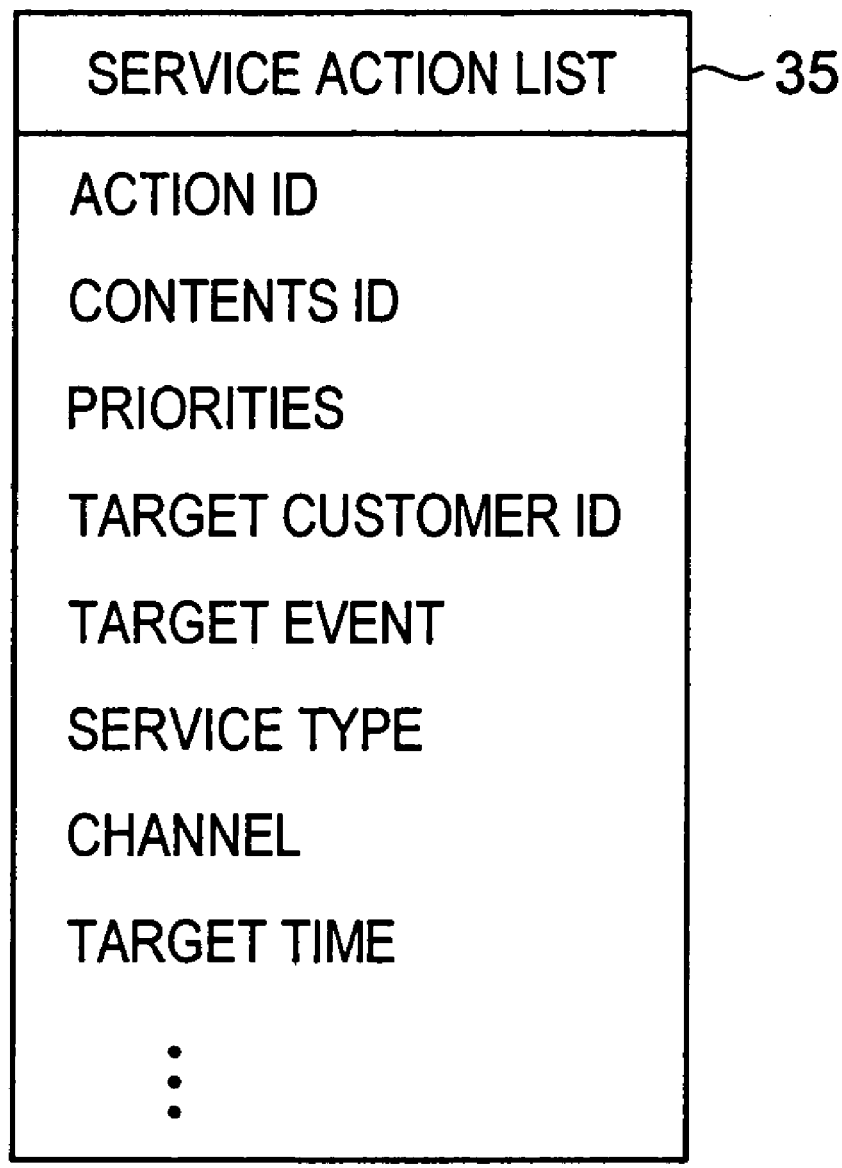
FIG. 6 is a diagram showing a part of a table configuration of a database in a service providing system with an automatic transaction apparatus according to a second embodiment of the present invention.

FIG. 6 is a diagram showing a part of a table configuration of a database in a service providing system with an automatic transaction apparatus according to the second embodiment of the present invention.

An example in which, when the service providing server 12 receives data transmitted from the automatic transaction apparatus 11, the service providing server 12 acquires current time to select optimum service contents depending on the current time, will be explained in the second embodiment. In the embodiment, in a table of the database in the service providing system 10, the configuration of the service action list 35 is changed into a configuration shown in FIG. 6. In the embodiment, target time is added to a field of the service action list 35. The target time is time such as morning, afternoon, early morning, or night in which a service is performed. When a service is performed in all the time when the target time is not set, unnecessary time setting can be omitted. Since the configuration of the other points is the same as that in the first embodiment, a description thereof will be omitted.

An operation of the service providing system 10 in the embodiment will be omitted.

Figure 7:
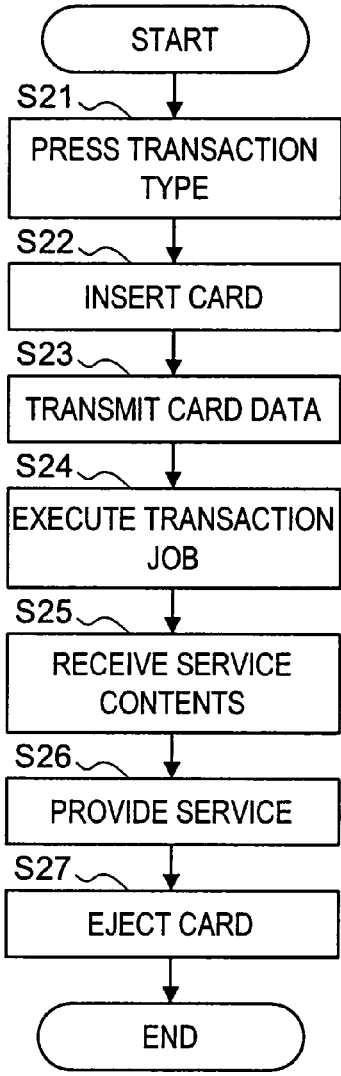
FIG. 7 is a flow chart showing an operation of the service providing system with the automatic transaction apparatus according to the second embodiment of the present invention.
Figure 7:
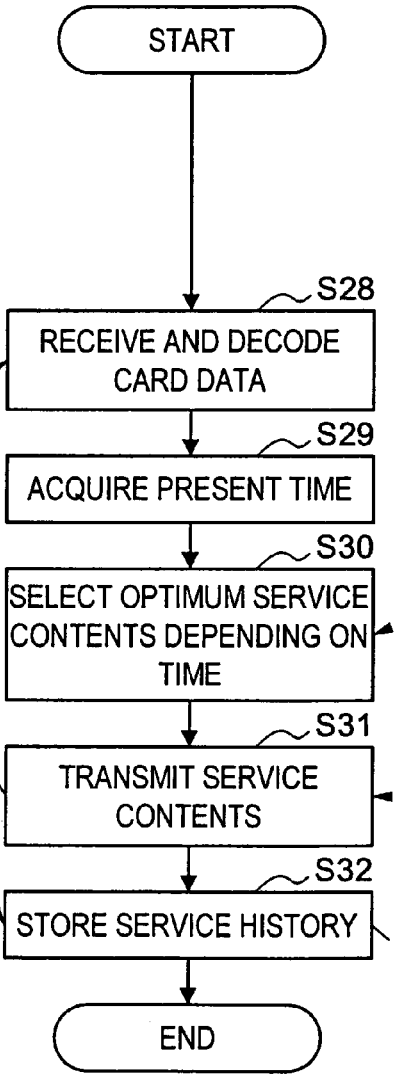
Figure 7:
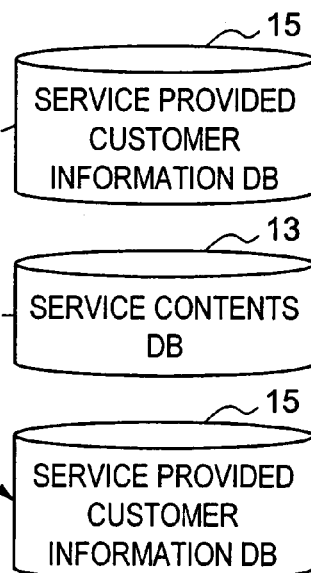

FIG. 7 is a flow chart of an operation of a service providing system with an automatic transaction apparatus according to the second embodiment of the present invention.

When a customer operates the automatic transaction apparatus 11 installed in a financial institution to select a financial transaction such as deposition, withdrawal, transfer, or balance inquiry, a screen for designating insertion of a card into a customer operation section is displayed. When the customer inserts a cash card into a card slot of the card handing section of the automatic transaction apparatus 11, a recording head of the card handing section reads a bank code, a branch number, an account number, and the like serving as card data stored in magnetic stripes or an IC of the cash card. The card data is transmitted from the automatic transaction apparatus 11 to the service providing server 12.

When the service providing server 12 receives the card data from the automatic transaction apparatus 11, the service providing server 12 decodes the card data. Furthermore, service providing server 12 acquires current time from a clock (not shown) and select optimum service contents depending on the acquired time according to a predetermined program registered in advance. The service providing server 12 transmits the selected service contents from the service contents database 13 to the automatic transaction apparatus 11.

The automatic transaction apparatus 11 receives the service contents from the service providing server 12. Upon completion of a business transaction, the automatic transaction apparatus 11 provides an additional service based on each of the service contents for a customer who uses the automatic transaction apparatus 11. Subsequently, the automatic transaction apparatus 11 transmits an operation history of the customer to the service providing server 12 and ejects the cash card from the card slot to end the process. When the service providing server 12 receives the operation history, the service providing server 12 stores the service history in the service provided customer information database 15 to end the process.

The flow chart will be described below.

Step S21 A customer selects a transaction type.

Step S22 The customer inserts a cash card into a card slot of a card handing section.

Step S23 The automatic transaction apparatus 11 transmits card data to the service providing server 12.

Step S24 The automatic transaction apparatus 11 executes a process of transactional work.

Step S25 The automatic transaction apparatus 11 receives service contents from the service providing server 12.

Step S26 The automatic transaction apparatus 11 provides a service for the customer.

Step S27 The automatic transaction apparatus 11 ejects the cash card from the card slot to end the process.

Step S28 The service providing server 12 receives the card data from the automatic transaction apparatus 11 and decodes the card data.

Step S29 The service providing server 12 acquires current time.

Step S30 The service providing server 12 selects optimum service contents depending on the time.

Step S31 The service providing server 12 transmits the service contents to the automatic transaction apparatus 11.

Step S32 The service providing server 12 stores a service history to end the process.

An operation performed when the service providing server 12 selects service contents to be provided for a customer will be described below.

Figure 8:
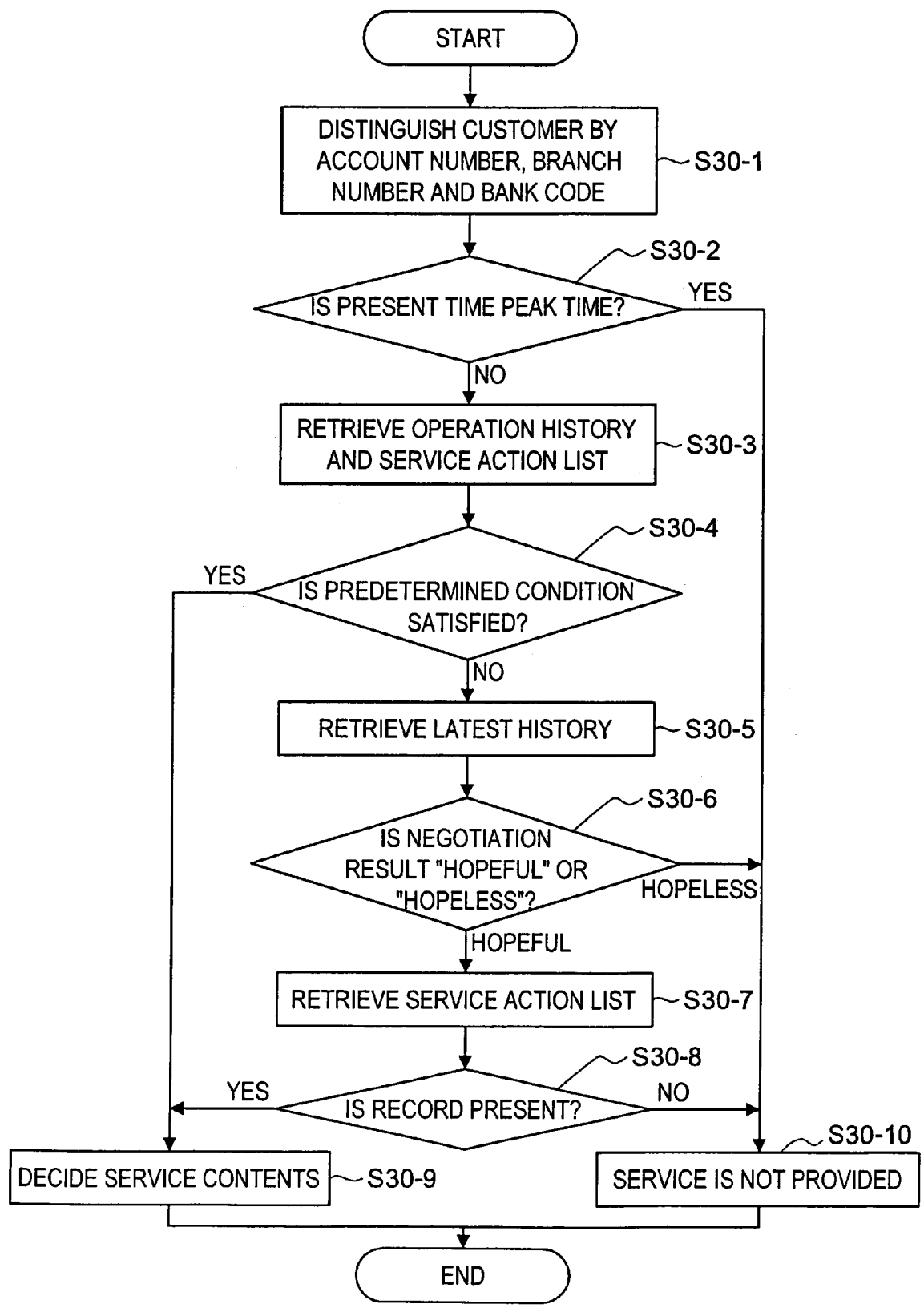
FIG. 8 is a flow chart showing an operation performed when a service providing server according to the second embodiment of the present invention selects service contents.

FIG. 8 is a flow chart showing an operation performed when the service providing server according to the second embodiment of the present invention selects service contents.

The service providing server 12 receives card data from the automatic transaction apparatus 11 and decodes the card data to distinguish a customer on the basis of an account number, a branch number, and a bank code. The service providing server 12 also acquires current time. Subsequently, the service providing server 12 decides whether the current time is peak time. When the current time is the peak time, the service providing server 12 ends the process without performing the service.

When the current time is not the peak time, the service providing server 12 searches the operation history 34 and the service action list 35 on the basis of the customer ID of the customer. The service providing server 12 decides whether predetermined conditions are satisfied. The predetermined conditions include a condition in which a priority is higher than a reference priority, a condition in which there is information of a target event, a condition in which a history conditions is matched when the number of times of use in the target event is designated, a condition in which a channel is the automatic transaction apparatus 11, a condition in which a customer corresponds to a target customer, a condition in which current time is target time, and the like. When a record which satisfies the predetermined conditions is included in the service action list 35, the service providing server 12 decides each of the service contents to select. As a reference value for comparing priorities with each other, a predetermined value (a first value) is set in advance.

On the other hand, when there is no record which satisfies the predetermined conditions, the service providing server 12 searches the latest history in the operation history 34 on the basis of the customer ID. It is decided whether a field of a negotiation result is "hopeful" or "hopeless". When the field is "hopeless", the process is ended without performing the service. On the other hand, when the field of the negotiation result is "hopeful", the service providing server 12 searches the service action list 35 under predetermined conditions. The predetermined conditions include a condition in which a channel is the automatic transaction apparatus 11, a condition in which a customer corresponds to a target customer, a condition in which a service satisfies the conditions and has the highest priority, a condition in which the current time is target time, and the like. The service providing server 12 decides whether there is a record which satisfies the predetermined conditions as a result of searching of the service action list 35. When there is the record, the service providing server 12 decides each of the service contents to select. When there is no record, the process is ended without performing a service.

In this case, as a reference value for comparing priorities with each other, a value (a second value) lower than that in the previous searching is used. In this manner, unnecessary information is not given to an unlikely customer, and service contents having a low priority can also be provided for a likely customer by the second searching.

The flow chart will be described below.

Step S30-1 The service providing server 12 distinguishes a customer on the basis of an account number, a branch number, and a bank code.

Step S30-2 The service providing server 12 decides whether current time is peak time. When the current time is the peak time, the flow shifts to step S30-10. When the current time is not the peak time, the flow shifts to step S30-3.

Step S30-3 The service providing server 12 searches the operation history 34 and the service action list 35 on the basis of a customer ID.

Step S30-4 The service providing server 12 decides whether there is record which satisfies the predetermined conditions as a searching result. When there is the record which satisfies the conditions, the flow shifts to step S30-9. When there is no record which satisfies the conditions, the flow shifts to step S30-5.

Step S30-5 The service providing server 12 searches the latest history on the basis of the customer ID.

Step S30-6 The service providing server 12 decides whether a field of a negotiation result of the latest history is "hopeful" or "hopeless". When the field of the negotiation result is "hopeful", the flow shifts to step S30-7. When the field of the negotiation result is "hopeless", the flow shifts to step S30-10.

Step S30-7 The service providing server 12 searches the service action list 35 under predetermined conditions.

Step S30-8 The service providing server 12 decides whether there is a record which satisfies the predetermined conditions as a result of searching of the service action list 35. When there is the record, the flow shifts to step S30-9. When there is no record, the flow shifts to step S30-10.

Step S30-9 The service providing server 12 decides each of the service contents to select and ends the process.

Step S30-10 The service providing server 12 ends the process without performing a service.

In the embodiment, since an operation performed when the service providing server 12 stores a service history is the same as that in the first embodiment, a description thereof will be omitted.

In this manner, according to the embodiment, each of the service contents which is selected by the service providing server 12 can be dynamically changed depending on time at which a customer operates the automatic transaction apparatus 11. For this reason, in addition to the effect of the first embodiment, more appropriate service contents can be provided. In congestion, the providing of the service can also be stopped.

The third embodiment of the present invention will be described below. The same reference numerals as in the first and second embodiments denote parts having the same structures as those in the first and second embodiments in the third embodiment, so that a description thereof will be omitted. A description of the same operations and the same effects as those in the first and second embodiments will be omitted.

FIG. 9 is a part of a table configuration of a database in the service providing system with the automatic transaction apparatus according to the third embodiment of the present invention.

An example in which, when the service providing server 12 receives data transmitted from the automatic transaction apparatus 11, the service providing server 12 specifies a location where the automatic transaction apparatus 11 is installed to select optimum service contents, will be described below. In the embodiment, the configurations of a customer master 32, a service action list 35, and a service contents list 36 in a table of a database in the service providing system 10 are changed into configurations shown in FIGS. 9A to 9C, respectively.

Main ones of added fields in the embodiment will be described below. A resident area indicates an area to which an address belongs. A business area indicates an area to which a place of work or a school belongs. A hobby type is a flag for classifying hobbies such as a sport and music. A target area indicates an area to which each of the service contents are provided. As methods of utilizing a target area field, two methods are conceived. The first method decides whether service contents are provided by checking whether a location where the automatic transaction apparatus 11 operated by a customer is installed belongs to the target area. The second method decides whether service contents are provided by checking whether a resident area or a business area of a customer is included in the target area. According to the former, appropriate service contents depending on a location where a customer is at the present can be provided for the customer. According to the latter, appropriate service contents depending on a location where a customer lives or a location where the customer works, i.e., a location that the customer frequently visits can be provided for the customer. A database of the service providing system 10 according to the embodiment may includes a table in which installation branch numbers of the automatic transaction apparatus 11 and locations are associated with each other to specify a location where the automatic transaction apparatus 11 is installed. Service contents such as advertisements of shops or facilities are added when managers or administrators of the shops or the facilities requests advertisements. Since the configuration of the other points is the same as that in the first embodiment, a description thereof will be omitted.

An operation of the service providing system 10 in the embodiment will be described below.

Figure 10:
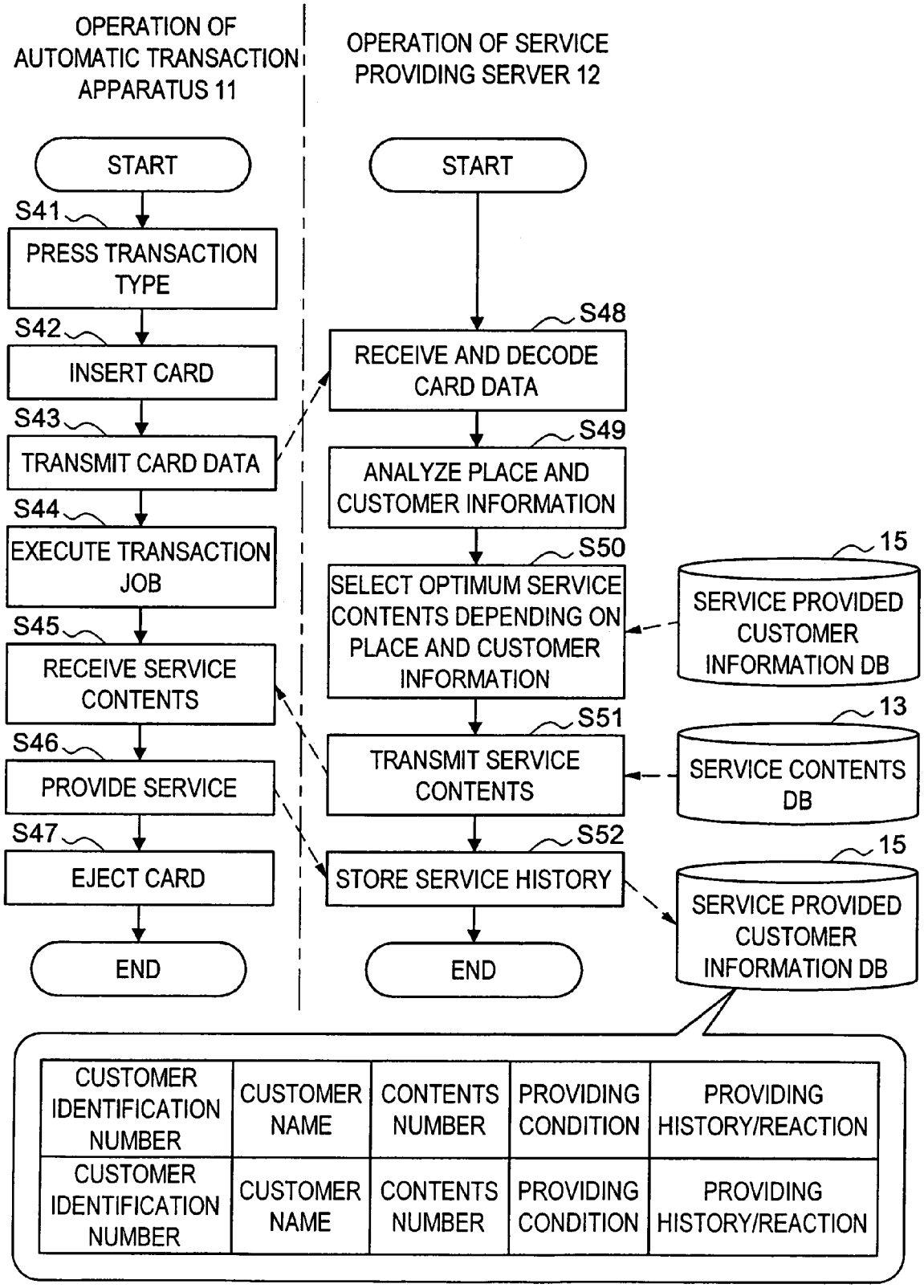
FIG. 10 is a flow chart showing an operation of the service providing system with the automatic transaction apparatus according to the third embodiment of the present invention.

FIG. 10 is a flow chart showing the operation of a service providing system with an automatic transaction apparatus according to the third embodiment of the present invention.

When a customer operates the automatic transaction apparatus 11 installed in a financial institution to select a financial transaction such as deposition, withdrawal, transfer, or balance inquiry, a screen for designating insertion of a card into a customer operation section is displayed. When the customer inserts a cash card into a card slot of the card handing section of the automatic transaction apparatus 11, a recording head of the card handing section reads an account number, a branch number, a bank code, and the like serving as card data stored in magnetic stripes or an IC of the cash card. The read card data is transmitted from the automatic transaction apparatus 11 to the service providing server 12. At this time, an installation branch number of the automatic transaction apparatus 11 is also transmitted to the service providing server 12.

When the service providing server 12 receives the card data from the automatic transaction apparatus 11, the service providing server 12 decodes the card data. Furthermore, the service providing server 12 decodes the installation branch number transmitted from the automatic transaction apparatus 11 to specify a location where the automatic transaction apparatus 11 is installed. For example, with reference to the table in which the installation branch numbers of the automatic transaction apparatus 11 and the areas are associated with each other as described above, the service providing server 12 can specify the location where the automatic transaction apparatus 11 is installed. Subsequently, the service providing server 12 analyzes a location and customer information according to a predetermined program registered in advance to select optimum service contents depending on the location and the customer information, and the service providing server 12 transmits the selected service contents from the service contents database 13 to the automatic transaction apparatus 11.

The automatic transaction apparatus 11 receives the service contents from the service providing server 12. Upon completion of a business transaction, the automatic transaction apparatus 11 provides an additional service based on each of the service contents for a customer who uses the automatic transaction apparatus 11. Subsequently, the automatic transaction apparatus 11 transmits an operation history of the customer to the service providing server 12 and ejects the cash card from the card slot to end the process. When the service providing server 12 receives the operation history, the service providing server 12 stores the service history in the service provided customer information database 15 to end the process.

The flow chart will be described below.

Step S41 A customer selects a transaction type.

Step S42 The customer inserts a cash card into a card slot of a card handing section.

Step S43 The automatic transaction apparatus 11 transmits card data and an installation branch number to the service providing server 12.

Step S44 The automatic transaction apparatus 11 executes a process of transactional work.

Step S45 The automatic transaction apparatus 11 receives service contents from the service providing server 12.

Step S46 The automatic transaction apparatus 11 provides a service for the customer.

Step S47 The automatic transaction apparatus 11 ejects the cash card from the card slot to end the process.

Step S48 The service providing server 12 receives the card data from the automatic transaction apparatus 11 and decodes the card data.

Step S49 The service providing server 12 analyzes a location where the automatic transaction apparatus 11 is installed and customer information.

Step S50 The service providing server 12 selects optimum service contents depending on the location where the automatic transaction apparatus 11 is installed and the customer information.

Step S51 The service providing server 12 transmits the service contents to the automatic transaction apparatus 11.

Step S52 The service providing server 12 stores a service history to end the process.

An operation performed when the service providing server 12 selects service contents to be provided for a customer will be described below in detail.

Figure 11:
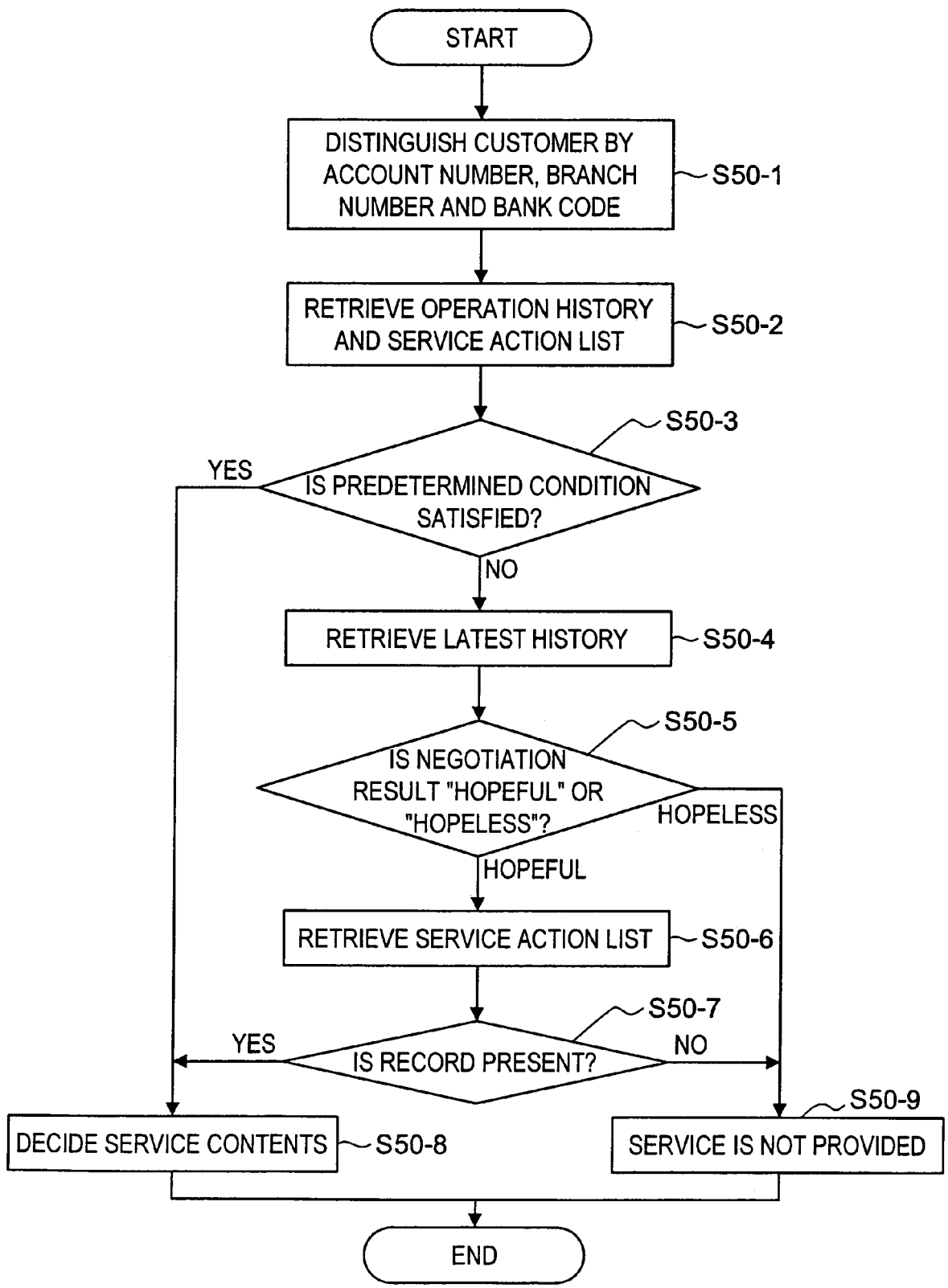
FIG. 11 is a flow chart showing an operation performed when a service providing server according to the third embodiment of the present invention selects service contents.

FIG. 11 is a flow chart showing an operation performed when a service providing server according to the third embodiment of the present invention selects service contents.

When the service providing server 12 receives card data from the automatic transaction apparatus 11 and decodes the card data, the service providing server 12 distinguishes a customer on the basis of an account number, a branch number, and a bank code. The service providing server 12 receives an installation branch number from the automatic transaction apparatus 11 to specify a location where the automatic transaction apparatus 11 is installed on the basis of the installation branch number. On the basis of the customer ID of the customer, the service providing server 12 searches the operation history 34 and the service action list 35. The service providing server 12 decides whether predetermined conditions are satisfied. The predetermined conditions include a condition in which a priority is higher than a reference priority, a condition in which there is information of a target event, a condition in which a history condition is matched when the number of times of use in the target event is designated, a condition in which a channel is the automatic transaction apparatus 11, a condition in which a customer corresponds to a target customer, and the like. Furthermore, the service providing server 12 may limit the search on the basis of the location where the automatic transaction apparatus 11 is installed. More specifically, when the corresponding record is included in the service action list 35 as a result of searching performed on the basis of the customer ID, it is checked whether the installation location of the automatic transaction apparatus 11 is included in the target area in the record. When the predetermined conditions are satisfied, and when there is the record in which the installation location of the automatic transaction apparatus 11 is included in the target area, the service providing server 12 determines service contents to end the process. As a reference value for comparing priorities with each other, a predetermined value (a first value) is set in advance.

When there is no record which satisfies the predetermined conditions, the service providing server 12 searches the latest history in the operation history 34 on the basis of a customer ID to decide whether a field of a negotiation result is "hopeful" or "hopeless". When the field is "hopeless", the process is ended without performing the service. On the other hand, when the field of the negotiation result is "hopeful", the service providing server 12 searches the service action list 35 under predetermined conditions. The predetermined conditions include a condition in which a channel is the automatic transaction apparatus 11, a condition in which a customer corresponds to a target customer, a condition in which a service satisfies the conditions and has the highest priority, a condition in which a resident area or a business area of the customer is equal to a target area or included in the target area, and the like. With reference to the service contents list 36, a condition in which a hobby type is matched can also be included in the predetermined conditions. The service providing server 12 decides whether there is a record which satisfies the predetermined conditions as a result of searching of the service action list 35. When there is the record, the service providing server 12 decides each of the service contents to select. When there is no record, the service providing server 12 ends the process without performing a service.

In this case, as a reference value for comparing priorities with each other, a value (a second value) lower than that in the previous searching is used. In this manner, unnecessary information is not given to an unlikely customer, and contents having a low priority can also be provided for a likely customer by second searching.

The flow chart will be described below.

Step S50-1 The service providing server 12 distinguishes a customer on the basis of an account number, a branch number, and a bank code.

Step S50-2 The service providing server 12 searches the operation history 34 and the service action list 35 on the basis of a customer ID.

Step S50-3 The service providing server 12 decides whether there is record which satisfies the predetermined conditions. When there is the record which satisfies the conditions, the flow shifts to step S50-8. When there is no record which satisfies the conditions, the flow shifts to step S50-4.

Step S50-4 The service providing server 12 searches the latest history on the basis of the customer ID.

Step S50-5 The service providing server 12 decides whether a field of a negotiation result is "hopeful" or "hopeless" as a result of searching. When the field of the negotiation result is "hopeful", the flow shifts to step S50-6. When the field of the negotiation result is "hopeless", the flow shifts to step S50-9.

Step S50-6 The service providing server 12 searches the service action list 35 under predetermined conditions.

Step S50-7 The service providing server 12 decides whether there is a record which satisfies the predetermined conditions as a result of searching of the service action list 35. When there is the record, the flow shifts to step S50-8. When there is no record, the flow shifts to step S50-9.

Step S50-8 The service providing server 12 decides each of the service contents to select and ends the process.

Step S50-9 The service providing server 12 ends the process without performing a service.

Since an operation performed when the service providing server 12 stores a service history in the embodiment is the same as that in the first embodiment, a description thereof will be omitted.

In this manner, in the embodiment, each of the service contents selected by the service providing server can be dynamically changed depending on customer information and a location of the automatic transaction apparatus 11 operated by the customer. In addition, service contents adapted to the resident area, the business area, or the hobby type of the customer can be selected. For this reason, according to the embodiment, in addition to the effects of the first and second embodiments, service contents which are more useful to a customer can be provided.

The fourth embodiment of the present invention will be described below. The same reference numerals as in the first to third embodiments denote parts having the same structures as those in the first to third embodiments in the fourth embodiment, so that a description thereof will be omitted. A description of the same operations and the same effects as those in the first to third embodiments will be omitted.

Figure 12A:
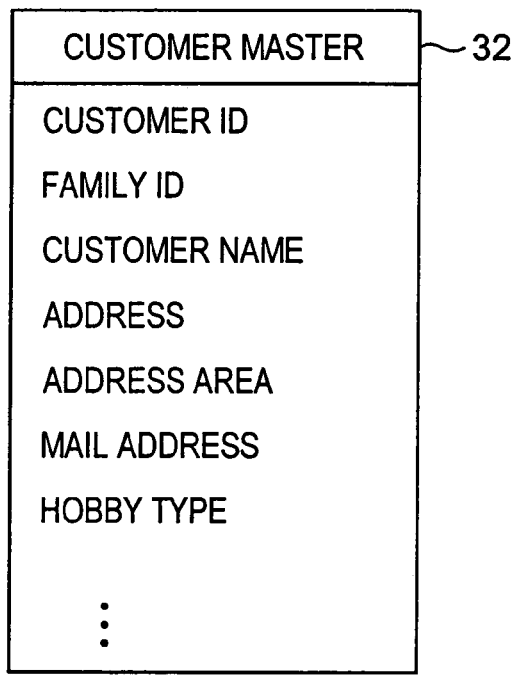
FIG. 12A is a diagram showing a part of a table configuration of a database of a service providing system with an automatic transaction apparatus according to a fourth embodiment of the present invention.
Figure 12B:
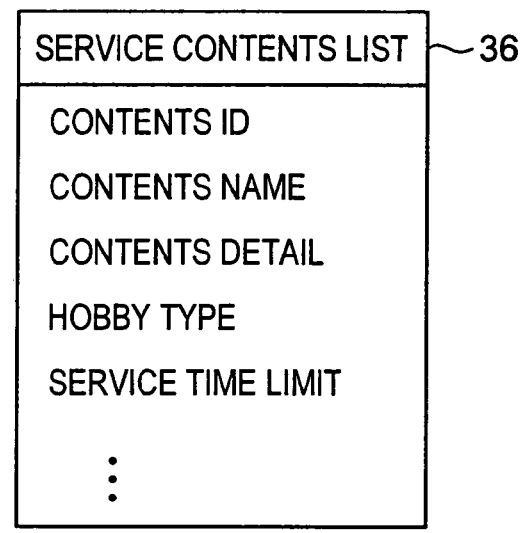
FIG. 12B is a diagram showing a part of a table configuration of a database of a service providing system with an automatic transaction apparatus according to a fourth embodiment of the present invention.

FIG. 12 is a part of a table configuration of a database in the service providing system with the automatic transaction apparatus according to the fourth embodiment of the present invention.

An example in which, when the service providing server 12 receives data transmitted from the automatic transaction apparatus 11, the service providing server 12 selects optimum service contents from an external event by acquiring the external event will be described below. In this case, the configurations of a customer master 32 and a service contents list 36 in a table of a database in the service providing system 10 are changed into configurations shown in FIGS. 12A to 12C, respectively.

Main ones of added fields in the embodiment will be described below. A hobby type is a flag for classifying hobbies. However, the hobbies must more closely be classified than in the third embodiment, and the field of the hobbies may be divided into a plurality of fields. Service expiration time is time and day at which providing of a service is ended. Since many external events have information which is valid for a short period of time, the service expiration time is given as an information to prevent a display of information the expiration time of which has passed. The external event information database 18 includes a table including the same fields as those of the service contents list 36 and stores external event information. When the external event information is registered, the event information is copied in the service contents database 13 by using the registration as a trigger, and the event information is automatically registered in the service action list 35 and the service contents list 36. A high priority is set to service contents from the external event information database 18.

Since the configuration of the other points is the same as that in the first embodiment, a description thereof will be omitted.

An operation of the service providing system 10 in the embodiment will be described below.

Figure 13:
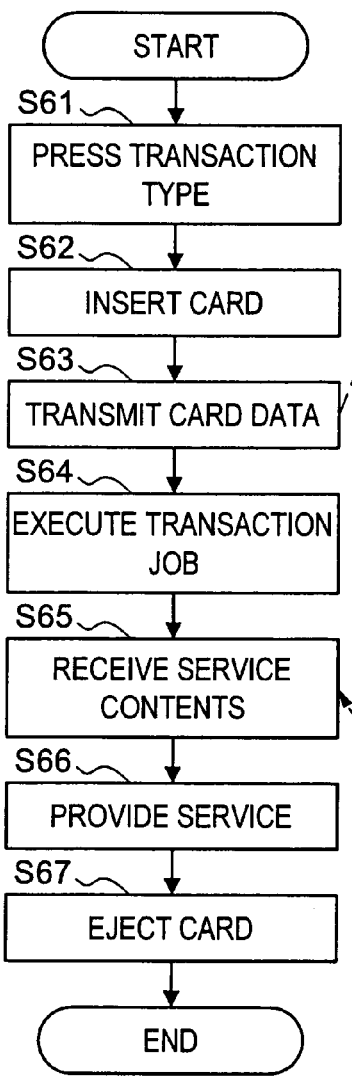
FIG. 13 is a flow chart showing an operation of the service providing system with the automatic transaction apparatus according to the fourth embodiment of the present invention.
Figure 13:
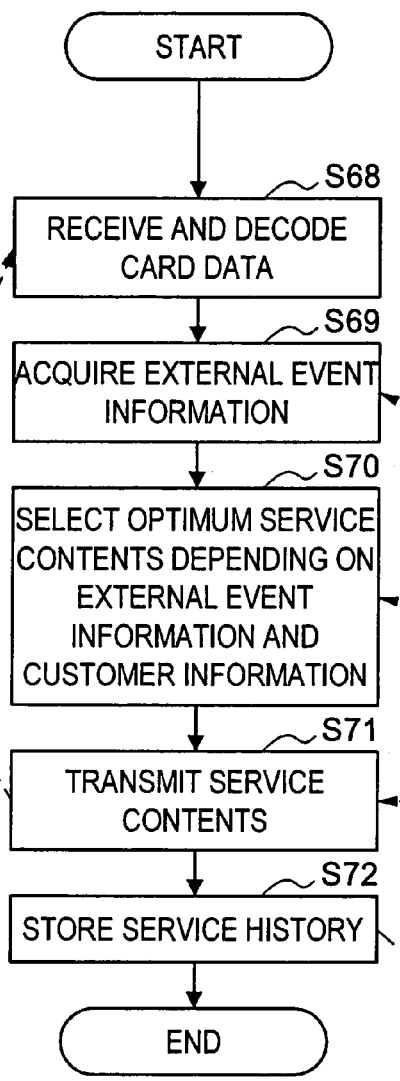
Figure 13:
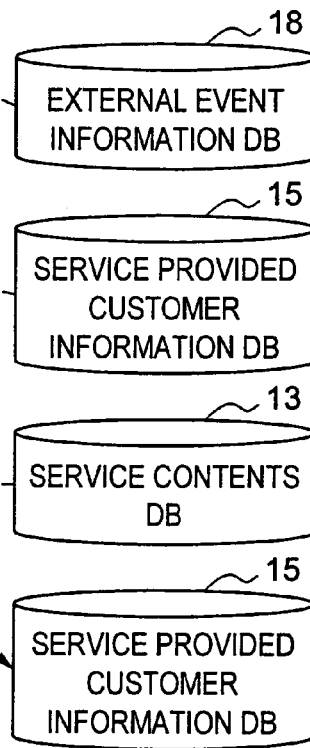

FIG. 13 is a flow chart showing the operation of a service providing system with an automatic transaction apparatus according to the fourth embodiment of the present invention.

When a customer operates the automatic transaction apparatus 11 installed in a financial institution to select a financial transaction such as deposition, withdrawal, transfer, or balance inquiry, a screen for designating insertion of a card into a customer operation section is displayed. When the customer inserts a cash card into a card slot of the card handing section of the automatic transaction apparatus 11, a recording head of the card handing section reads an account number, a branch number, a bank code, and the like serving as card data stored in magnetic stripes or an IC of the cash card. The card data is transmitted from the automatic transaction apparatus 11 to the service providing server 12.

When the service providing server 12 receives the card data from the automatic transaction apparatus 11, the service providing server 12 decodes the card data. Furthermore, the service providing server 12 acquires an external event optimum to the decoded customer information from the external event information database 18. In this case, the external event is an information event such as share prices or news which are acquired externally. Subsequently, the service providing server 12 selects optimum service contents depending on the external event information and the customer information according to a predetermined program registered in advance, and the service providing server 12 transmits the selected service contents from the service contents database 13 to the automatic transaction apparatus 11.

The automatic transaction apparatus 11 receives the service contents from the service providing server 12. Upon completion of a business transaction, the automatic transaction apparatus 11 provides an additional service based on each of the service contents for a customer who uses the automatic transaction apparatus 11. Subsequently, the automatic transaction apparatus 11 transmits an operation history of the customer to the service providing server 12 and ejects the cash card from the card slot to end the process. When the service providing server 12 receives the operation history, the service providing server 12 stores the service history in the service provided customer information database 15 to end the process.

The flow chart will be described below.

Step S61 A customer selects a transaction type.

Step S62 The customer inserts a cash card into a card slot of a card handing section.

Step S63 The automatic transaction apparatus 11 transmits card data to the service providing server 12.

Step S64 The automatic transaction apparatus 11 executes a process of transactional work.

Step S65 The automatic transaction apparatus 11 receives service contents from the service providing server 12.

Step S66 The automatic transaction apparatus 11 provides a service for the customer.

Step S67 The automatic transaction apparatus 11 ejects the cash card from the card slot to end the process.

Step S68 The service providing server 12 receives the card data from the automatic transaction apparatus 11 and decodes the card data.

Step S69 The service providing server 12 acquires external event information.

Step S70 The service providing server 12 selects optimum service contents depending on the external event information and customer information.

Step S71 The service providing server 12 transmits the service contents to the automatic transaction apparatus 11.

Step S72 The service providing server 12 stores a service history to end the process.

An operation performed when the service providing server 12 selects service contents to be provided for a customer will be described below in detail.

Figure 14:
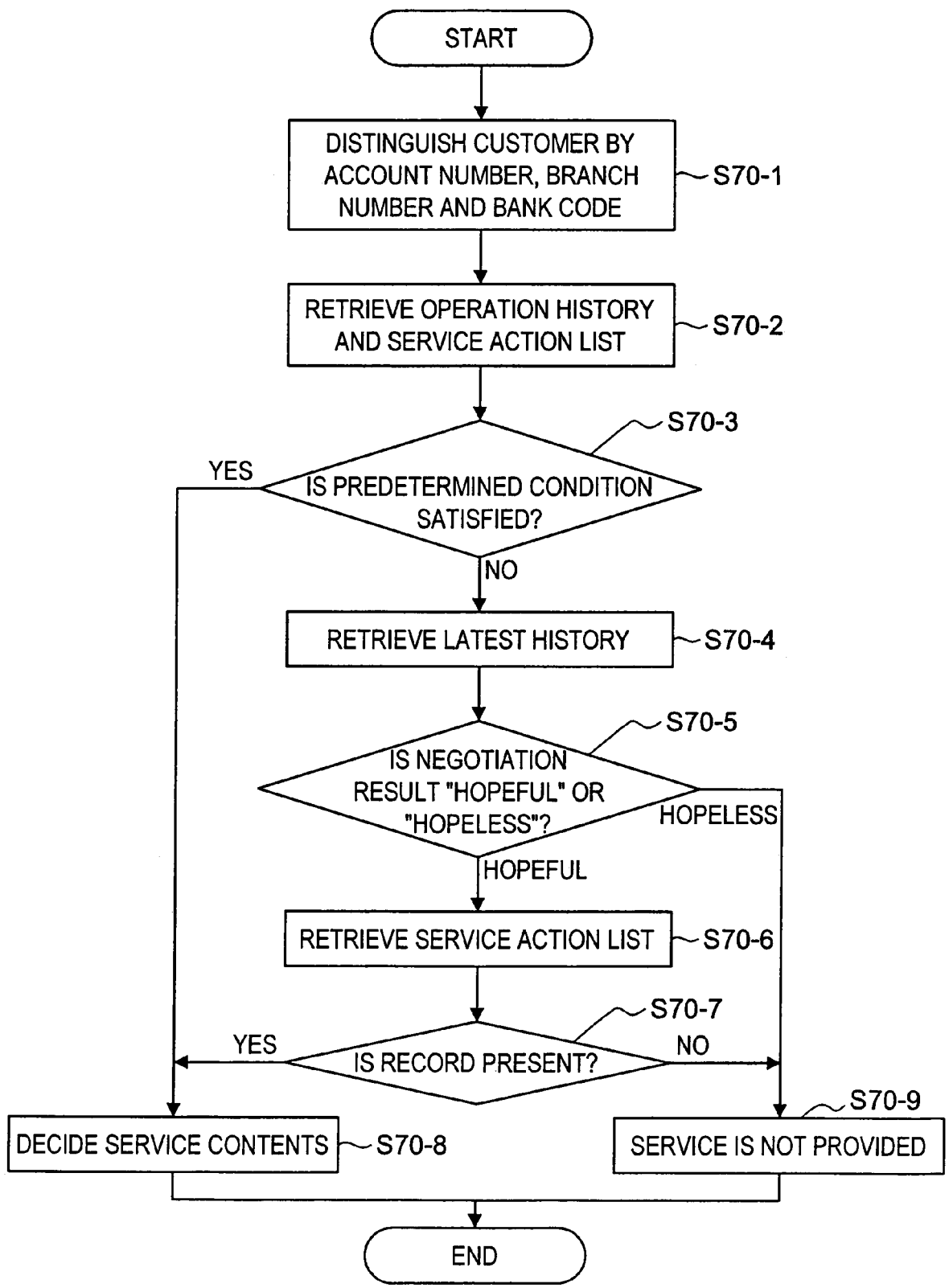
FIG. 14 is a flow chart showing an operation performed when a service providing server according to the fourth embodiment of the present invention selects service contents.

FIG. 14 is a flow chart showing an operation performed when a service providing server according to the fourth embodiment of the present invention selects service contents.

When the service providing server 12 receives card data from the automatic transaction apparatus 11 and decodes the card data, the service providing server 12 distinguishes a customer on the basis of an account number, a branch number, and a bank code. The service providing server 12 searches the operation history 34 and the service action list 35 on the basis of a customer ID of the customer. The service providing server 12 decides whether predetermined conditions are satisfied. The predetermined conditions include a condition in which a priority is higher than a reference priority, a condition in which there is information of a target event, a condition in which a history is matched when the number of times of use in the target event is designated, a condition in which a channel is the automatic transaction apparatus 11, a condition in which a customer corresponds to a target customer, a condition in which a hobby type is matched, and the like. Furthermore, in the service action list 35, since service expiration time is included in a record associated with an external event, the service expiration time is compared with the current time and day to also check whether the service expiration time has passed. As described above, since a high priority is set to the external event, the external event easily satisfies the predetermined conditions. The service providing server 12 decides each of the service contents to select and ends the process when the record which satisfies the predetermined condition is included in the service action list 35. A reference value for comparing priorities with each other, a predetermined value (a first value) is set in advance.

When there is no record which satisfies the predetermined conditions, the service providing server 12 searches the latest history in the operation history 34 on the basis of a customer ID to decide whether a field of a negotiation result is "hopeful" or "hopeless". When the field is "hopeless", the process is ended without performing the service. On the other hand, when the field of the negotiation result is "hopeful", the service providing server 12 searches the service action list 35 under predetermined conditions. The predetermined conditions include a condition in which a channel is the automatic transaction apparatus 11, a condition in which a customer corresponds to a target customer, a condition in which a service satisfies the conditions and has the highest priority, and the like. The service providing server 12 decides whether there is a record which satisfies the predetermined conditions as a result of searching of the service action list 35. When there is the record, the service providing server 12 decides each of the service contents to select. When there is no record, the service providing server 12 ends the process without performing a service.

In this case, as a reference value for comparing priorities with each other, a value (a second value) lower than that in the previous searching is used. In this manner, unnecessary information is not given to an unlikely customer, and contents having a low priority can also be provided for a likely customer by second searching.

The flow chart will be described below.

Step S70-1 The service providing server 12 distinguishes a customer on the basis of an account number, a branch number, and a bank code.

Step S70-2 The service providing server 12 searches the operation history 34 and the service action list 35 on the basis of a customer ID.

Step S70-3 The service providing server 12 decides whether there is record which satisfies the predetermined conditions. When there is the record which satisfies the conditions, the flow shifts to step S70-8. When there is no record which satisfies the conditions, the flow shifts to step S70-4.

Step S70-4 The service providing server 12 searches the latest history on the basis of the customer ID.

Step S70-5 The service providing server 12 decides whether a field of a negotiation result is "hopeful" or "hopeless" as a result of searching. When the field of the negotiation result is "hopeful", the flow shifts to step S70-6. When the field of the negotiation result is "hopeless", the flow shifts to step S70-9.

Step S70-6 The service providing server 12 searches the service action list 35 under predetermined conditions on the basis of the customer ID.

Step S70-7 The service providing server 12 decides whether there is a record which satisfies the predetermined conditions as a result of the searching. When there is the record, the flow shifts to step S70-8. When there is no record, the flow shifts to step S70-9.

Step S70-8 The service providing server 12 decides each of the service contents to select and ends the process.

Step S70-9 The service providing server 12 ends the process without performing a service.

Since an operation performed when the service providing server 12 stores a service history in the embodiment is the same as that in the first embodiment, a description thereof will be omitted.

In this manner, in the embodiment, each of the service contents which is selected by the service providing server 11 can be dynamically changed depending on an external event. For this reason, according to the embodiment, in addition to the effects of the first to the third embodiments, information which is not only useful to a customer but also is latest can be distributed.

A service providing system with an automatic transaction apparatus according to the present invention can be applied to not only an automatic transaction apparatus of a financial institution but also a ticket-vending machine held by a railroad company, various self-terminals such as a season ticket issuing machine, various self-terminals such as an automatic check-in terminal and a ticket-bending machine held by an airline company, various KIOSK terminals installed in convenience stores, a self-reception terminal installed in a hospital or the like, and the like.

The preferred embodiments of the present invention have been described above with reference to the accompanying drawings. However, the present invention is not limited to the embodiments as a matter of course. It is apparent to a person skilled in the art that various changes or modifications of the invention are effective without departing from the spirit and scope of the invention. It is understood that the changes and modifications belong to the spirit and scope of the invention as a matter of course.

What is claimed is:

1. A service providing system with an automatic transaction apparatus comprising:
   an automatic transaction apparatus for providing a service for a customer who performs a financial transaction;
   a database for storing customer information, an operation history, and service contents wherein
   the database stores a list including information of the service contents which can be provided for the customer and priority information of each of the service contents; and
   a service providing server for selecting at least one of the service contents stored in the database and transmitting each of the selected service contents to the automatic transaction apparatus, wherein
   the service providing server dynamically selects each of the service contents on the basis of the customer information, the operation history of the customer and the priority information of each of the service contents.

2. The service providing system with the automatic transaction apparatus according to claim 1, wherein the database stores information of target time at which the service is provided, and the service providing server dynamically selects each of the service contents depending on time at which the customer operates the automatic transaction apparatus.

3. The service providing system with the automatic transaction apparatus according to claim 1, wherein the database stores information at a location where the automatic transaction apparatus is installed, and the service providing server dynamically selects each of the service contents depending on the location where the automatic transaction apparatus which the customer operates is installed.

4. The service providing system with the automatic transaction apparatus according to claim 1, wherein the database stores external event information, and the service providing server dynamically selects each of the service contents depending on the external event information.

5. The service providing system with the automatic transaction apparatus according to claim 1, wherein the service providing server selects each of the service contents where the priority information of which is not less than a first value in a first searching, performs a next searching when any of the service contents is not corresponding, and selects each of the service contents where the priority information of which is not less than a second value lower than the first value in the next searching.

6. The service providing system with the automatic transaction apparatus according to claim 5, wherein information of a reaction of the customer is stored in the operation history, and the next searching is performed when any of the service contents is not corresponding in the first searching and a positive reaction of the customer is included in the operation history.

7. The service providing system with the automatic transaction apparatus according to claim 1, wherein the automatic transaction apparatus displays each of the service contents transmitted from the service providing server such that the customer can operate each of the service contents, accepts an operation of the customer for each of the service contents, and information of a positive or negative reaction is stored in the operation history depending on details of the operation of the customer in the automatic transaction apparatus.

8. A service providing server which is connected to an automatic transaction apparatus for providing a service for a customer who performs a financial transaction and a database for storing customer information, an operation history, and service contents, the database storing a list including information of the service contents which can be provided for the customer and priority information of each of the service contents; wherein each of the service contents stored in the database are dynamically selected on the basis of the customer information, the operation history of the customer and the priority information of each of the service contents and then transmitted to the automatic transaction apparatus.

9. The service providing server according to claim 8, wherein information of target time at which the service is provided is stored in the database, and each of the service contents is dynamically selected depending on time at which the customer operates the automatic transaction apparatus.

10. The service providing server according to claim 8, wherein information of a location where the automatic transaction apparatus is installed is stored in the database, and each of the service contents is dynamically selected depending on the location where the automatic transaction apparatus which the customer operates is installed.

11. The service providing server according to claim 8, wherein external event information is stored in the database, and each of the service contents is dynamically selected depending on the external event information.

12. The service providing server according to claim 8, wherein each of the service contents where the priority information of which is not less than a first value is selected in a first searching, a next searching is performed when any of the service contents is not corresponding, and each of the service contents where the priority information of which is not less than a second value lower than the first value is selected in the next searching.

13. The service providing server according to claim 12, wherein information of a reaction of the customer is stored in the operation history, and the next searching is performed when any of the service contents is not corresponding in the first searching and a positive reaction of the customer is included in the operation history.

14. A service providing method with an automatic transaction apparatus, which is realized by using:
   an automatic transaction apparatus for providing a service for a customer who performs a financial transaction; a database for storing customer information, an operation history, and service contents wherein
   the database stores a list including information of the service contents which can be provided for the customer and priority information of each of the service contents; and
   a service providing server for selecting at least one of the service contents stored in the database and transmitting each of the service contents to the automatic transaction apparatus, wherein each of the service contents is dynamically selected on the basis of the customer information, the operation history of the customer and the priority information of each of the service contents.

15. The service providing method with the automatic transaction apparatus according to claim 14, wherein the database stores information of target time at which the service is provided, and each of the service contents is dynamically selected depending on time at which the customer operates the automatic transaction apparatus.

16. The service providing method with the automatic transaction apparatus according to claim 14, wherein the database stores information at a location where the automatic transaction apparatus is installed, and each of the service contents is dynamically selected depending on the location where the automatic transaction apparatus which the customer operates is installed.

17. The service providing method with the automatic transaction apparatus according to claim 14, wherein the database stores external event information, and each of the service contents is dynamically selected depending on the external event information.

18. The service providing method with the automatic transaction apparatus according to claim 14, wherein the service providing server selects each of the service contents where the priority information of which is not less than a first value in a first searching, performs a next searching when any of the service contents is not corresponding, and selects each of the service contents where the priority information of which is not less than a second value lower than the first value in the next searching.

19. The service providing method with the automatic transaction apparatus according to claim 18, wherein information of a reaction of the customer is stored in the operation history, and the next searching is performed when any of the service contents is not corresponding in the first searching and a positive reaction of the customer is included in the operation history.

20. The service providing method with the automatic transaction apparatus according to claim 14, wherein the automatic transaction apparatus displays each of the service contents transmitted from the service providing server such that the customer can operate each of the service contents, accepts an operation of the customer for each of the service contents, and information of a positive or negative reaction is stored in the operation history depending on details of the operation of the customer in the automatic transaction apparatus.

* * * * *